US012651716B2

(12) United States Patent
Gregoire et al.

(10) Patent No.: US 12,651,716 B2
(45) Date of Patent: Jun. 9, 2026

(54) CIRCUIT BREAKER COMPRISING AN IMPROVED GAS FLOW MANAGEMENT

(71) Applicant: General Electric Technology GmbH, Baden (CH)

(72) Inventors: Cyril Gregoire, Villerbanne (FR); Quentin Rognard, Villerbanne (FR); Cédric Delhomme, Villerbanne (FR)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 320 days.

(21) Appl. No.: 18/432,339

(22) Filed: Feb. 5, 2024

(65) Prior Publication Data

US 2024/0266129 A1 Aug. 8, 2024

(30) Foreign Application Priority Data

Feb. 7, 2023 (EP) .................................... 23305164

(51) Int. Cl.
*H01H 33/70* (2006.01)
*H01H 33/90* (2006.01)

(52) U.S. Cl.
CPC ...... *H01H 33/7046* (2013.01); *H01H 33/905* (2013.01); *H01H 2033/908* (2013.01)

(58) Field of Classification Search
CPC .. H01H 33/7046; H01H 33/905; H01H 33/91; H01H 33/90; H01H 33/901; H01H 2033/906; H01H 2033/908
USPC ....... 218/148, 53, 57, 59, 61, 63, 66, 68, 43
See application file for complete search history.

(56) References Cited

U.S. PATENT DOCUMENTS 6,207,917 B1 * 3/2001 Lehmann ............... H01H 33/88 218/51
8,546,716 B2 * 10/2013 Nufer .................. H01H 33/901 218/43
8,779,316 B2 * 7/2014 Drews .................... H01H 33/74 218/51

(Continued)

FOREIGN PATENT DOCUMENTS

EP 1 347 484 A1 9/2003
EP 1 939 910 A1 7/2008

(Continued)

OTHER PUBLICATIONS

Extended European Search Report issued in EP Application No. 23305164.8 dated Jul. 11, 2023, 7 pages.

*Primary Examiner* — William A Bolton
(74) *Attorney, Agent, or Firm* — Eversheds Sutherland (US) LLP

(57) ABSTRACT

A high-voltage circuit breaker filled with gas, including two arcing contacts, a support in which a thermal volume, a compression volume, and an exhaust gas chamber are formed. A first radial wall separating the thermal volume and the compression volume, which is movable within the support. A second radial wall separating the compression volume and the exhaust gas chamber. A buffer volume is formed in the support and is separated from the compression volume and the exhaust gas chamber by associated walls, that are designed to be connected to the compression volume only to allow gas stored in the buffer volume to be discharged towards the compression volume.

9 Claims, 7 Drawing Sheets

(56) References Cited

U.S. PATENT DOCUMENTS

| | | | | |
|---|---|---|---|---|
| 8,822,868 | B2 * | 9/2014 | Kehr | H01H 33/86 218/66 |
| 9,899,167 | B2 * | 2/2018 | Florez | H01H 33/7015 |
| 2011/0163069 | A1 * | 7/2011 | Ohlsson | H01H 33/901 218/66 |
| 2013/0168357 | A1 * | 7/2013 | Yaginuma | H01H 33/08 218/57 |
| 2018/0342363 | A1 * | 11/2018 | Ozil | H01H 33/703 |

FOREIGN PATENT DOCUMENTS

| | | | |
|---|---|---|---|
| EP | 2 343 721 | A1 | 7/2011 |
| EP | 3 179 498 | A1 | 6/2017 |
| EP | 3 840 005 | A1 | 6/2021 |

* cited by examiner

CIRCUIT BREAKER COMPRISING AN IMPROVED GAS FLOW MANAGEMENT

TECHNICAL FIELD

The invention concerns a high voltage gas circuit breaker comprising an improved gas flow management, particularly suited for cooling down the main contacts during an opening phase of the circuit breaker.

BACKGROUND

Modern high voltage gas circuit breaker, known as live tank, dead tank, or gas-insulated switchgear circuit breaker, are using self-blast or puffer technology to efficiently blast an electric arc formed when opening the circuit breaker.

A gas flow management is intended to increase the efficiency of the blast.

Document EP-2.343.721 discloses a circuit breaker comprising a thermal volume, a compression volume, a discharge volume and an exhaust volume.

This discharge volume, which is located between the compression volume and the exhaust volume, receives all the gas coming from the discharge of the compression volume.

This design implies the presence of a wall between the compression volume and the discharge volume and another wall between the discharge volume and the exhaust volume.

Also, each wall comprises a pair of orifices, a discharge valve associated with one orifice of each wall, which opens to allow the discharge of gas towards the exhaust volume and a refilling valve associated with the other orifice of each wall to allow cooling gas to fill the discharge volume or the compression volume during a closing of the circuit breaker.

The presence of the wall between the discharge volume and the exhaust volume has an impact on the high pressure gas flow towards the exhaust volume.

Also, the high pressure is applied on the refilling valves, reducing their efficiency and durability because both the compression discharge and the exhausts overpressure will be applied on the discharge valve preventing it from opening properly.

Document EP-384.0005 discloses a circuit breaker comprising a thermal volume, a compression volume and an exhaust volume.

This circuit breaker also comprises an additional buffer volume from which gas can be injected in the thermal volume through an additional valve located in the thermal volume. This solution is difficult to realize as the design constraints are important in the thermal volume.

Also, according to this document, holes are formed on the outside surface of the heating volume which are in practice difficult to realize and there is no spring charged inlet valve in the buffer volume. In addition, the described buffer volume is difficult to seal in practice.

The object of the invention is to provide a circuit breaker designed to allow better high pressure gas flow during the opening phase of the circuit breaker and permitting the valves to operate efficiently.

SUMMARY

The invention concerns a high-voltage circuit breaker filled with an insulating gas and having a main axis A, comprising:

- a female arcing contact and a male arcing contact that are designed to selectively be in electrical contact one with the other, that are radially surrounded by an insulating nozzle;
- two main contacts facing axially each other and arranged radially outside of the insulating nozzle, each of the main contacts being assigned and electrically connected to one of the arcing contacts,
- a support carrying one of the two main contacts and the associated arcing contact, in which a thermal volume, a compression volume and an exhaust gas chamber are formed, so as to be aligned axially within the support,
- a first radial wall axially separating the thermal volume and the compression volume, which is axially movable within the support,
- a second radial wall axially separating the compression volume and the exhaust gas chamber,
- characterized in that it further comprises a buffer volume that is separated from the compression volume and the exhaust gas chamber by associated walls that is designed to be connected to the compression volume by means only to allow gas under pressure, that is stored in the buffer volume, to be discharged towards the compression volume.

Preferably, the buffer volume is also able to be selectively connected to the exhaust gas chamber and to an annular main chamber surrounding the support depending on the operating conditions of the high-voltage circuit breaker.

Preferably, the buffer volume is separated from the compression volume by the second radial wall, said second radial wall comprises a primary opening and an associated primary valve selectively connecting the buffer volume to the compression volume.

Preferably, the buffer volume is separated from the annular main chamber by the support and wherein the support comprises a secondary opening and an associated secondary valve selectively connecting the buffer volume to the annular main chamber.

Preferably, the buffer volume is separated from the exhaust gas chamber by an annular wall and wherein the annular wall comprises a tertiary opening and an associated tertiary valve selectively connecting the buffer volume to the exhaust gas chamber.

Preferably, the first radial wall comprises a first opening associated with a first valve, selectively connecting the thermal volume to the compression volume.

Preferably, the second radial wall comprises a second opening associated with a second valve, selectively connecting the compression volume to the exhaust gas chamber.

Preferably, an opening phase of the circuit breaker, consisting of an axial displacement of the first radial wall together with the female arcing contact in a direction away from the male arcing contact, comprises:

- a first step during which only the first valve is opened and during which the electric contact between the arcing contacts ceases, producing an electric arc;
- a second step during which only the second valve and the tertiary valve are opened independently one from the other;
- a third step during which all the valves are closed;
- a fourth step during which only the first valve is opened; and
- a fifth step during which only the first valve and the primary valve are opened.

Preferably, during a closing phase of the circuit breaker, following an opening phase, only the primary valve and the secondary valve are opened.

Preferably, at least one of the valves is spring loaded to adjust the operating conditions of the circuit breaker on which said valve opens.

DETAILED DESCRIPTION OF PARTICULAR EMBODIMENTS

Figure 1:
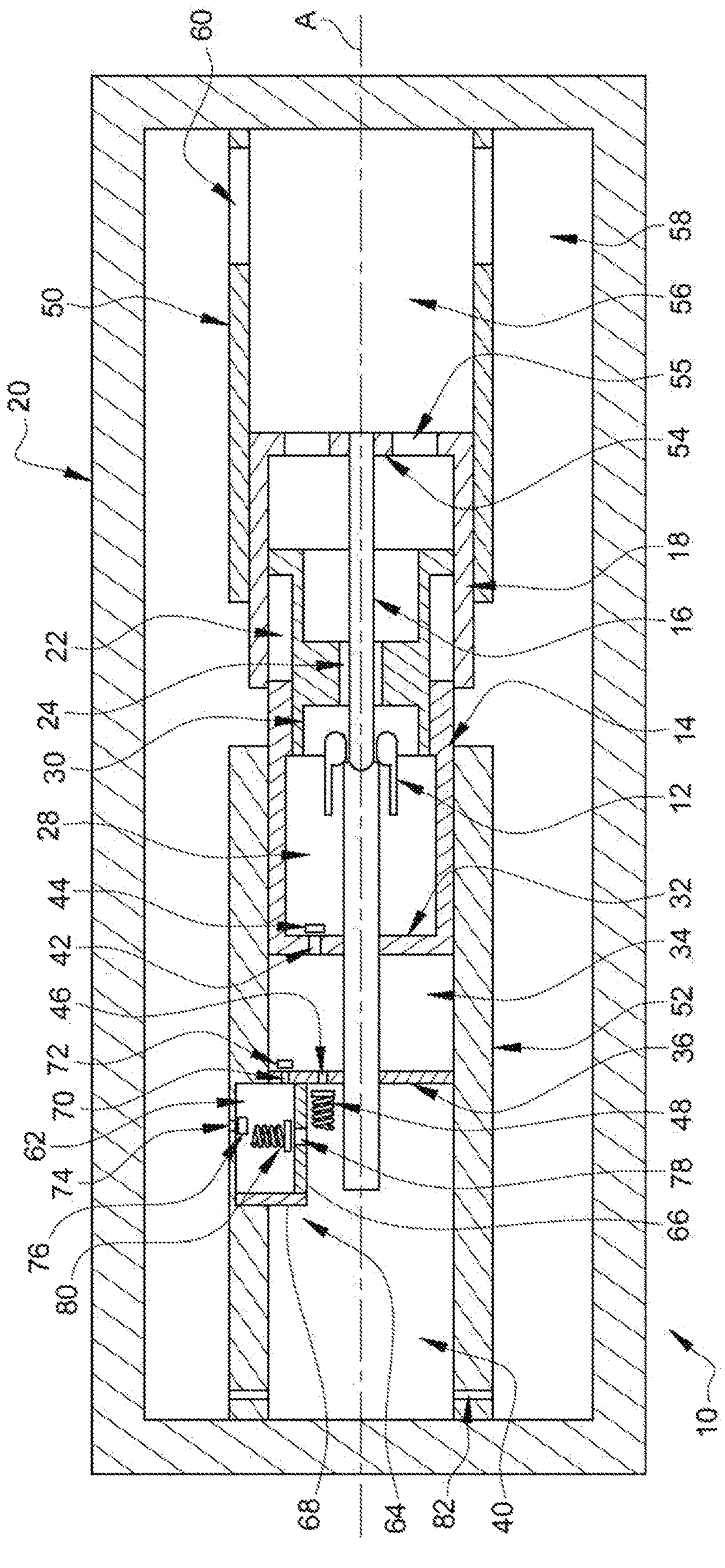
FIG. 1 is a schematic diagram of an axial section of a circuit breaker according to the invention.

FIG. 1 illustrates an essentially axi-symmetrical example embodiment of a high-voltage circuit breaker 10 with a longitudinal main axis A. A tulip-shaped female arcing contact 12, acting as a female arcing contact, with an associated first main contact 14 and a pin-shaped male arcing contact 16, acting as a male arcing contact with an associated second main contact 18 are installed on the inside of a pressurized vessel 20 that is filled with an insulating gas.

The vessel 20 is made for example of porcelain, a composite material or aluminum.

As non-limiting examples, the insulating gas is selected from the following list: $SF_6$, $CO_2$, a mixture of $CO_2$ and $O_2$, a mixture comprising Fluoronitrile (2,3,3,3-tetrafluoro-2-(trifluoromethyl)-2-propanenitrile) or $CF_3$)2CFCN), $CO_2$ and $O_2$, a mixture of Fluoronitrile and $N_2$, a mixture comprising Fluoronitrile (put here "the full name), $CO_2$, a mixture comprising a Fluoroketone, $CO_2$ and $O_2$, of a mixture of a Fluoroketone with $N_2$.

The main contacts 14, 18 are arranged in radial direction outside of the arcing contacts 12, 16.

The associated contacts 12, 14 and 16, 18, respectively are arranged coaxially to each other and are displaced relative to each other, jointly or not in the case of a single motion circuit breaker, in the direction of the longitudinal axis A, meaning from a closed, and thus switched-on, end position to an opened, and thus switched-off, end position, and back again.

In FIG. 1, the circuit breaker is represented in the closed position.

In this closed position, the female and male arcing contacts 12, 16 are in contact with each other and the first and second main contacts 14, 18 are in contact with each other, so that electrical current can flow via the contacts 12-18.

In the opened position, the arcing contacts 12, 16 are separated from each other and are distant axially. Also, the first and second main contacts 14, 18 are also separated from each other and are distant axially, so that no current can flow.

An insulating nozzle 22, made of insulating material, is fixed to the tulip-shaped female arcing contact 12 and the associated first main contact 14. This nozzle 22 surrounds the two arcing contacts 12, 16 when the circuit breaker 10 is in the closed position.

The nozzle 22 comprises a central through bore 24 in which the pin-shaped male arcing contact 16 can move during the opening or closing of the circuit breaker 10. The size of the bore 24 is complementary to the pin-shaped male arcing contact 16, thereby partially sealing the through bore 24. In the switched-on end position, almost no insulating gas can thus flow through the insulating nozzle 22.

Figure 3:
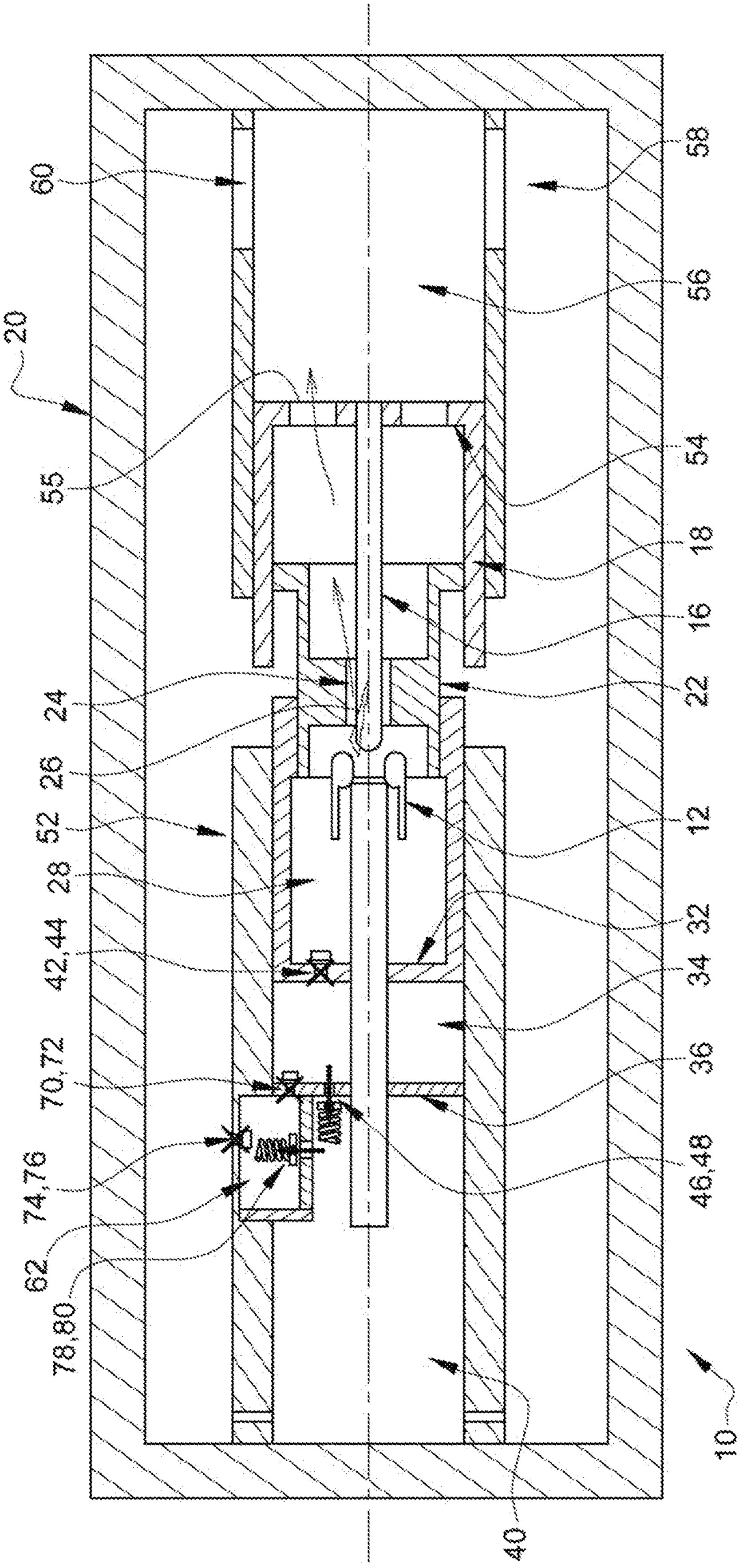

An electric arc 26, represented on FIG. 3, is generated during an opening of the circuit breaker 10, that is a transition from the closed position towards the opened position.

During the opening of the circuit breaker, in case of single motion circuit breaker, the tulip-shaped female arcing contact 12 and the associated main contact 14 move axially away from the pin shaped arcing contact 16 and the associated main contact 18, here to the left on the drawings. The single motion of the circuit breaker 10 is commonly called tulip shaped movement.

According to another embodiment, which is represented on the drawings and that is commonly designated as dual motion circuit breaker, both the tulip-shaped female arcing contact 12 and the pin-shaped male arcing contact 16 move in the circuit breaker 10. During an opening phase of the circuit breaker 10, the tulip-shaped female arcing contact 12 and the associated main contact 14 move to the left, away from the pin shaped arcing contact 16 and the associated main contact 18, whereas the pin-shaped male arcing contact 16 and the associated main contact 18 move to the right, away from the tulip-shaped female arcing contact 12 and the associated main contact 14.

Whatever the embodiment of the circuit breaker 10, that is single motion or dual motion, the nozzle 22 moves together with the tulip-shaped female arcing contact 12 and the associated main contact 14, that is, here, to the left.

In a first time of the opening, the electric contact between the first main contact 14 and the second main contact 18 is broken while the contact between the pin-shaped male arcing contact 16 and the tulip shaped female arcing contact 12 remains. The electric current can still flow through the pin-shaped male arcing contact 16 and the tulip shaped female arcing contact 12.

In a second time of the opening, the electric contact between the pin-shaped male arcing contact 16 and the tulip shaped female arcing contact 12 is broken.

The electric arc 26 forms between the tulip-shaped female arcing contact 12 and the pin-shaped male arcing contact 16, and heats the insulating gas. The heating of the insulating gas results in an expansion of the insulating gas located between the arcing contacts 12, 16, which is the gas located inside of the insulating nozzle 22.

Then, the pin-shaped male arcing contact 16 exits the insulating nozzle 22, so that a greater quantity of the insulating gas can flow through the insulating nozzle 22.

In the opened position of the circuit breaker 10, which is the switched-off end position, the tulip-shaped female arcing contact 12 and the associated main contact 14 have been moved to the left while the pin-shaped male arcing contact 16 and the associated main contact 18 have stayed immobile in case of a tulip contact movement circuit breaker 10.

Or, in case of a dual motion circuit breaker 10, the tulip-shaped female arcing contact 12 and the associated main contact 14 have been moved to the left while the pin-shaped male arcing contact 16 and the associated main contact 18 have been moved to the right.

In this opened position, the axial distance between the tulip-shaped female arcing contact 12, and the associated main contact 14, and the pin-shaped male arcing contact 16, and the associated main contact 18, is large enough to prohibit formation of an electric arc.

On the side of the pin-shaped male arcing contact 16, the circuit breaker 10 comprises a carrier 50, of cylindrical shape, that supports the pin-shaped male arcing contact 16 and the associated main contact 18 via a radial supporting wall 54. When the circuit breaker is of the dual motion type, the carrier also guides the pin-shaped male arcing contact 16, the associated main contact 18 in axial movement and the radial supporting wall 54.

Similarly, on the side of the tulip-shaped female arcing contact 12, the circuit breaker 10 comprises a support 52 that supports and guides the tulip-shaped female arcing contact 12, the first main contact 14 and the insulating nozzle 22. The support 52 consists of a cylindrical component coaxial with main axis A.

As previously mentioned, the electric arc 26 is generated between the arcing contacts 12, 16, inside the bore 24, as a result of the separation of the arcing contacts 12-16.

Once a current zero crossing occurs, insulating gas is blown onto this electric arc 26. This insulating gas is fed from a thermal volume 28 formed in the support 52 that communicates with the bore 24 of the nozzle 22 via a channel 30 formed in the nozzle 22, towards the region of the insulating nozzle 22, in which the electric arc 26 is present.

The thermal volume 28 is designed to move axially together with the tulip-shaped female arcing contact 12 and the associated main contact 14.

Preferably, the thermal volume 28 is radially bounded by the first main contact 14 and is axially bounded, at its distal end from the insulating nozzle 22, which is to say at its left side end, by a first radial wall 32. Preferably, the first radial wall 32 is fixed to the main contact 14 so as to be movable within the support 52 in the axial direction.

The circuit breaker 10 also comprises a compression volume 34 located axially at the other side of the first radial wall 32, with respect to the thermal volume 28. The compression volume 34 is axially bounded by the first radial wall 32 at a first end and by a second radial wall 36 at the second axial end. The compression volume 34 is radially bounded by the support 52.

Preferably, the second radial wall 36 is fixed within the support 52. As an alternative embodiment, the radial wall 36 is movable within the support 52.

The circuit breaker 10 comprises an exhaust gas chamber 40 located axially at the other side of the second radial wall 36 with respect to the compression volume 34, that is to say at its left side.

Accordingly, the thermal volume 28, the compression volume 34 and the exhaust gas chamber 40 are aligned axially within the support 52 and are respectively separated by the first radial wall 32 and the second radial wall 36.

The first radial wall 32 comprises a first opening 42 allowing gas to flow between the thermal volume 28 and the compression volume 34. A first valve 44 is associated with the first opening 42 and is able to open or close the first opening 42 depending on the operating conditions of the circuit breaker 10.

The second radial wall 36 comprises a second opening 46 allowing gas to flow between the compression volume 34 and the exhaust gas chamber 40. A second valve 48, which is preferably spring charged, is associated with the second opening 46 and is able to open or close the second opening 46 depending on the operating conditions of the circuit breaker 10.

The carrier 50 delimits a secondary exhaust gas chamber 56 that is in communication with the through bore 24 of the nozzle 22 via holes 55 formed in the radial supporting wall 54.

The circuit breaker 10 also comprises an annular main chamber 58 surrounding the carrier 50 and the support 52.

The annular main chamber 58 is connected with the exhaust gas chamber 40 through openings 82 formed on the support 52 and is connected to the secondary exhaust gas chamber 56 through openings 60 formed on the carrier 50.

The circuit breaker 10 further comprises a buffer volume 62 that is able to communicate with the compression volume 34, the exhaust gas chamber 40 and the annular main chamber 58.

According to a preferred embodiment, the buffer volume 62 is preferably separated from the compression volume 34 by the second radial wall 36; is preferably separated from the annular main chamber 58 by the support 52; and is preferably separated from the exhaust gas chamber 40 by an annular wall 64.

As a non-limiting example, the annular wall 64 comprises a first cylindrical part 66 extending axially away from the arcing contacts 12, 16 and a radial part 68 extending radially from the free end of the cylindrical part 66 to the support 52.

The radial wall 36 comprises a primary opening 70 connecting the buffer volume 62 to the compression volume 34 and an associated primary valve 72 which is preferably, but not necessarily spring charged.

The support 52 comprises a secondary opening 74 connecting the buffer volume 62 to the annular main chamber 58 and an associated secondary valve 76 which is preferably, but not necessarily spring charged.

The annular wall 64 comprises a tertiary opening 78 connecting the buffer volume 62 to the exhaust gas chamber 40 and an associated tertiary valve 80 which is preferably, but not necessarily spring charged.

In the following description, operation of the circuit breaker 10 as previously disclosed will be described.

In the following description on an opening phase and a closing phase of the circuit breaker, an opened valve will be represented in FIG. 2 and following by an arrow symbolizing the gas flow through the orifice associated with said valve, and a closed valve will be represented by a cross or X.

An opening phase of the circuit breaker 10 is made of a plurality of steps.

At a starting point represented on FIG. 12, the circuit breaker 10 is in a closed configuration, the tulip-shaped female arcing contact 12 and the pin-shaped male arcing contact 16 are in electrical contact one with the other.

At this starting point, all the valves are closed.

Figure 2:
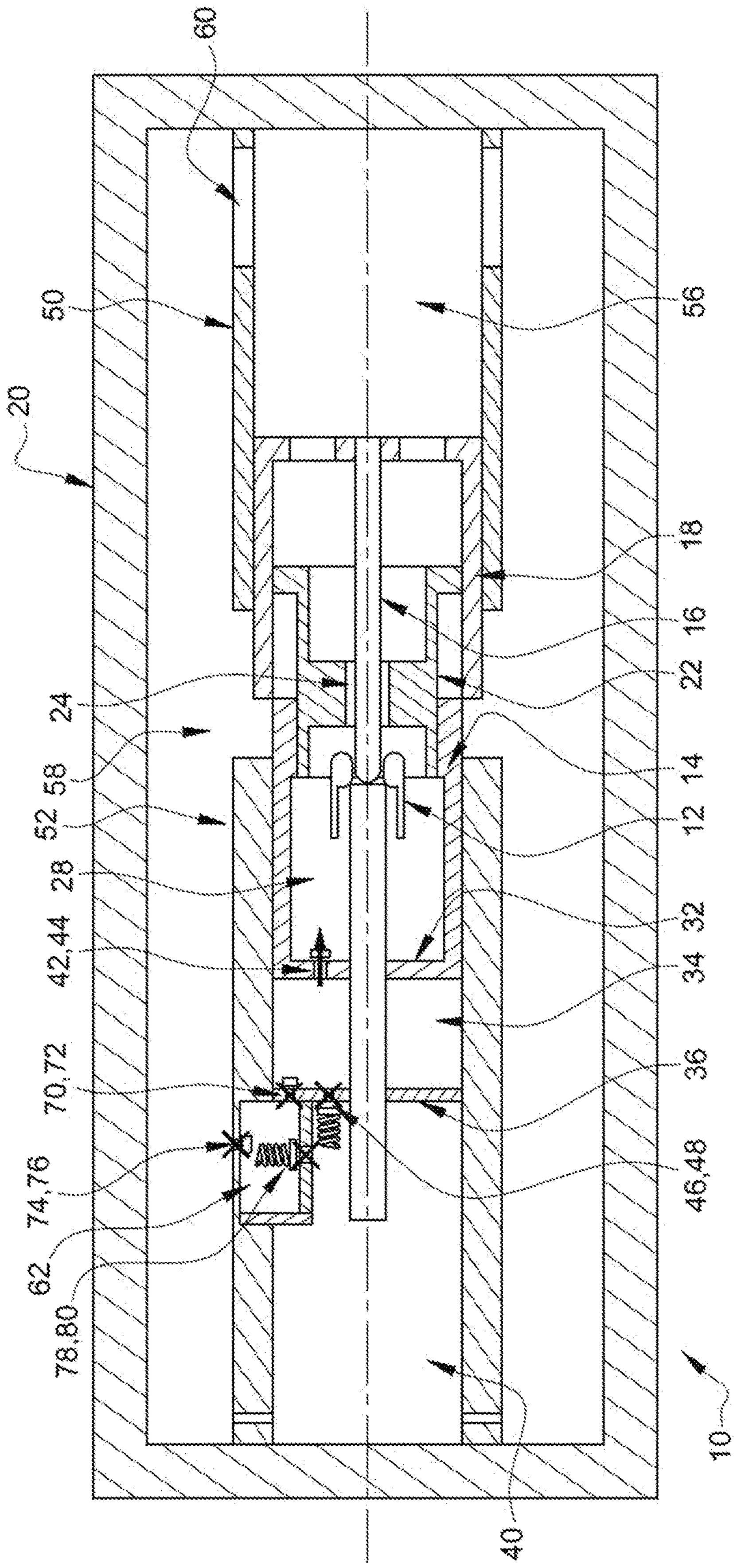
FIGS. 2 to 6 are diagrams similar to FIG. 1, showing the valves configuration at successive steps of an opening phase of the circuit breaker of the invention.

In a first step represented on FIG. 2, the tulip-shaped female arcing contact 12 and the associated first main contact 14 move within the support 52 away from the pin-shaped male arcing contact 16. As a consequence, the first radial wall 32 that is fixed to the first main contact 14 moves axially in the same direction.

The volume of the compression volume 34 decreases, the gas pressure in the compression volume 34 increases.

As a consequence, the first valve 44 opens, allowing gas to flow from the compression volume 34 towards the thermal volume 28.

The other valves remain closed.

During this first step, in case of a dual motion circuit breaker as represented, the pin-shaped male arcing contact 16 and the associated second main contact 18 move axially in the opposite direction, away from the tulip-shaped female arcing contact 12 and the associated first main contact 14.

At an intermediary point of this first step, the electric contact between the tulip-shaped female arcing contact 12 and the pin-shaped male arcing contact 16 ceases, an electric arc 26 is formed.

In the region between the two arcing contacts 12, 16, the insulating gas is heated by the electric arc 26 and expands in the direction toward the tulip-shaped female arcing contact 12, as well as in the direction toward the pin-shaped male arcing contact 16.

A portion of this gas flows along the pin-shaped male arcing contact 16, flows through the secondary exhaust gas chamber 56 to reach the annular main chamber 58 in which the gas pressure is relatively lower.

Another portion of this gas flows inside the tulip-shaped female arcing contact 12 to reach the exhaust volume 40.

A last portion of the gas flows through the channel 30 into the thermal volume 28 which produces an increase of the gas pressure in the thermal volume 28

In a second step represented on FIG. 3, the gas pressure in the thermal volume 28 becomes greater than the pressure in the compression volume 34.

This difference of pressures forces the first valve 44 to close.

During this second step, the first radial wall 32 continues to move axially away from the nozzle 22, that is to say to the left in the drawings.

The volume of gas in the compression volume 34 decreases, the pressure therein increases, that causes the second valve 48 to open.

Preferably, the stiffness of the spring associated with the second valve 48 is defined so that the second valve 48 opens when the pressure in the compression volume 34 reaches a predetermined overpressure.

The compression volume 34 and the exhaust gas chamber 40 communicate with each other. As a result, gas contained in the compression volume 34, flows in the exhaust gas chamber 40 to the annular main chamber 58.

The gas pressure in the exhaust gas chamber 40 increases as a result of the combined gas flow coming from the compression volume and the arc 26. As a consequence, the tertiary valve 80 opens allowing gas to feed the buffer volume 62. Preferably, the stiffness of the spring associated with the tertiary valve 80 is defined so that the tertiary valve 80 opens when the pressure in the exhaust gas chamber 40 reaches a predetermined overpressure which is set with a charged spring acting on the tertiary valve 80.

The primary valve 72 and the secondary valve 76 remain closed.

Figure 4:
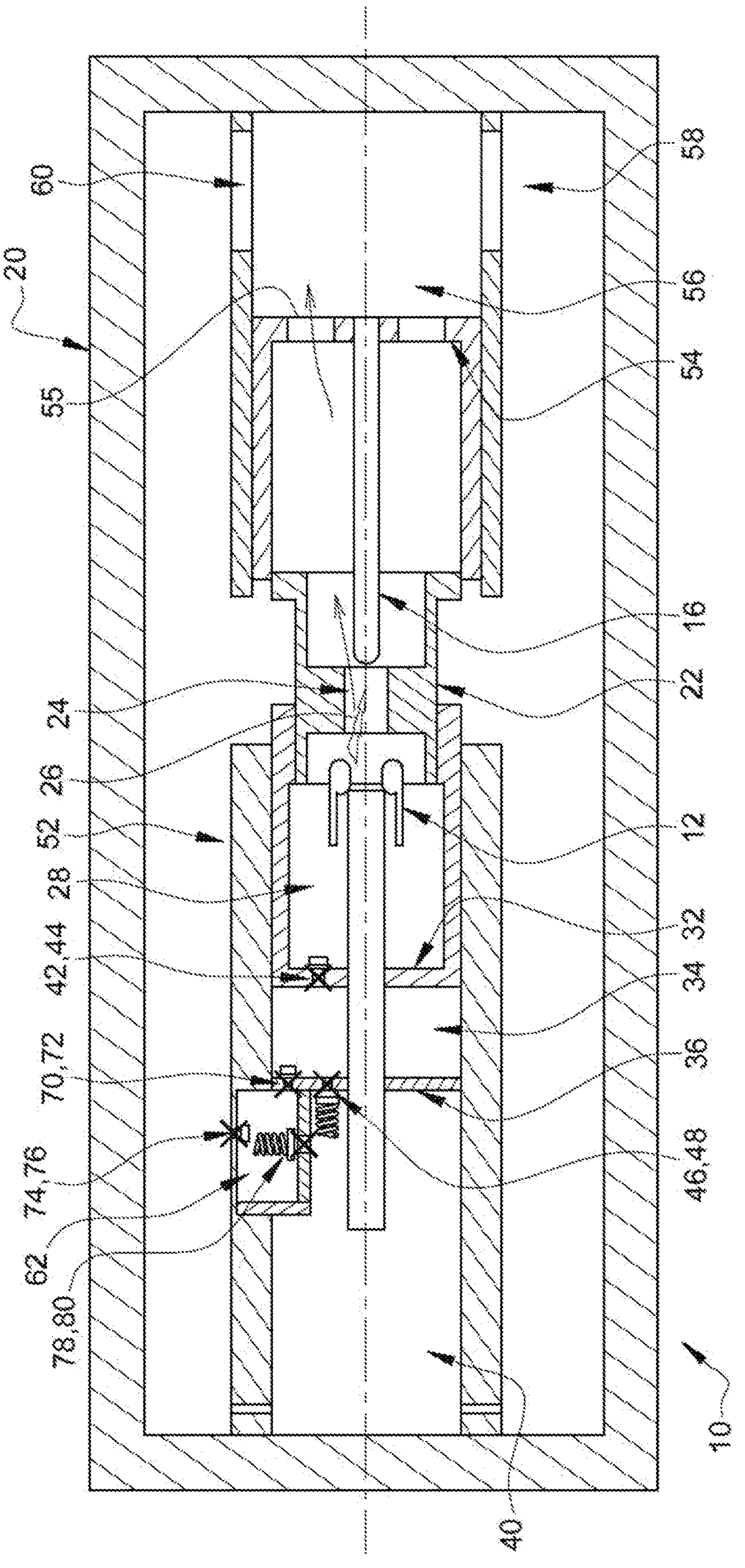

In a third step represented on FIG. 4, the electric arc 26 is still present. However, the gas pressure in the exhaust gas chamber 40 begins to reduce after having reached an upper value.

As a consequence of the reduced value of the gas pressure in the exhaust gas chamber 40, the tertiary spring charged valve 80 closes. The second valve 48 closes when the pressure difference between the compression volume 34 and the exhaust gas chamber 40 reaches a predefined value.

The other valves remain closed.

Figure 5:
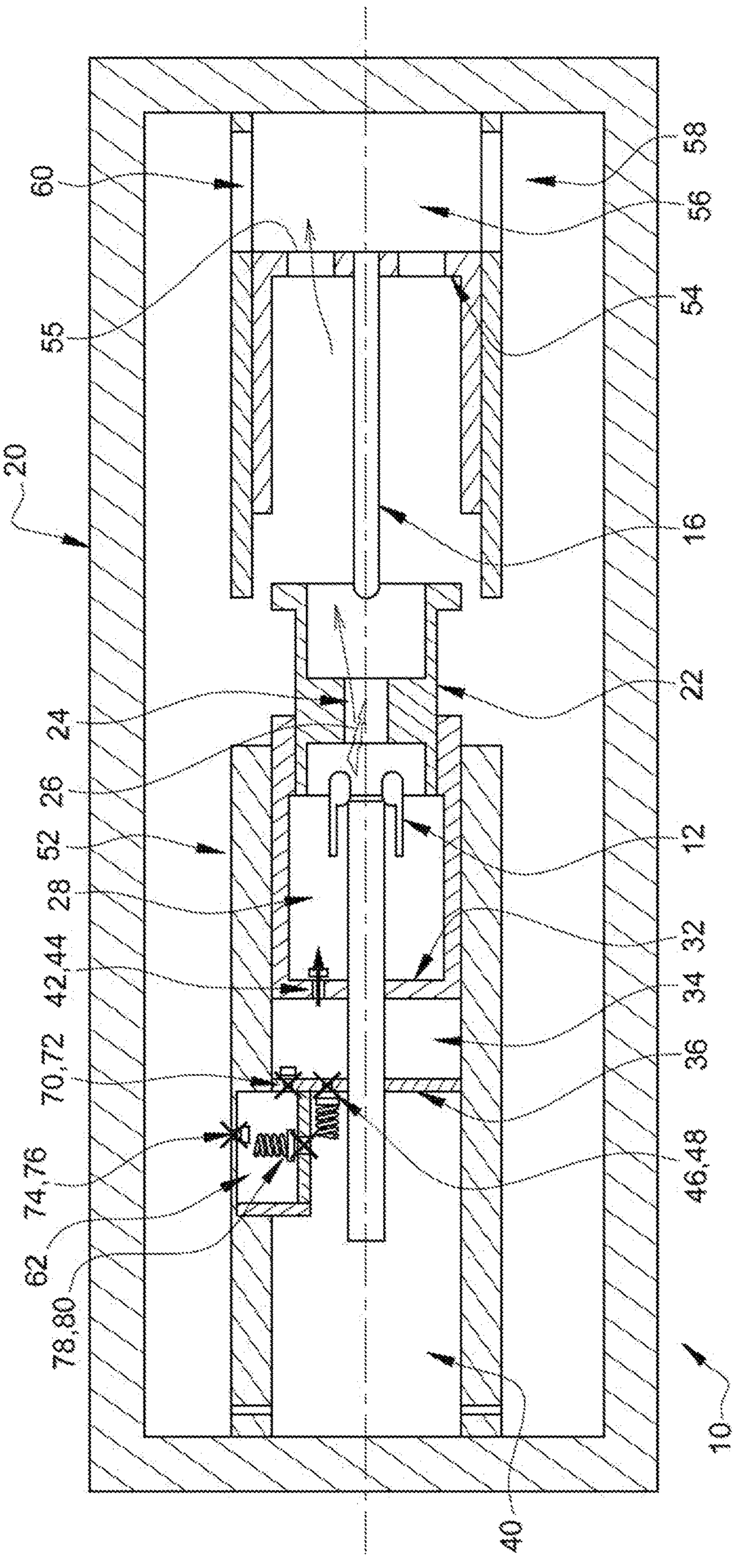

In a fourth step represented on FIG. 5, the electric arc 26 may still be present.

Most of the dielectric gas which was present in the thermal volume 28 has been discharged towards the electric arc 26, the gas pressure in the thermal volume 28 decreases as a consequence.

The gas pressure in the compression volume 34 becomes greater than the gas pressure in the thermal volume 28. As a consequence, the first valve 44 opens, allowing gas under pressure, that is stored in the compression volume 34 to be discharged towards the electric arc 26.

The temperature of the gas flowing from the compression volume 34 towards the electric arc 26 is lower than the gas temperature in the thermal volume 28, allowing for an improved cooling of the thermal volume 28.

Figure 6:
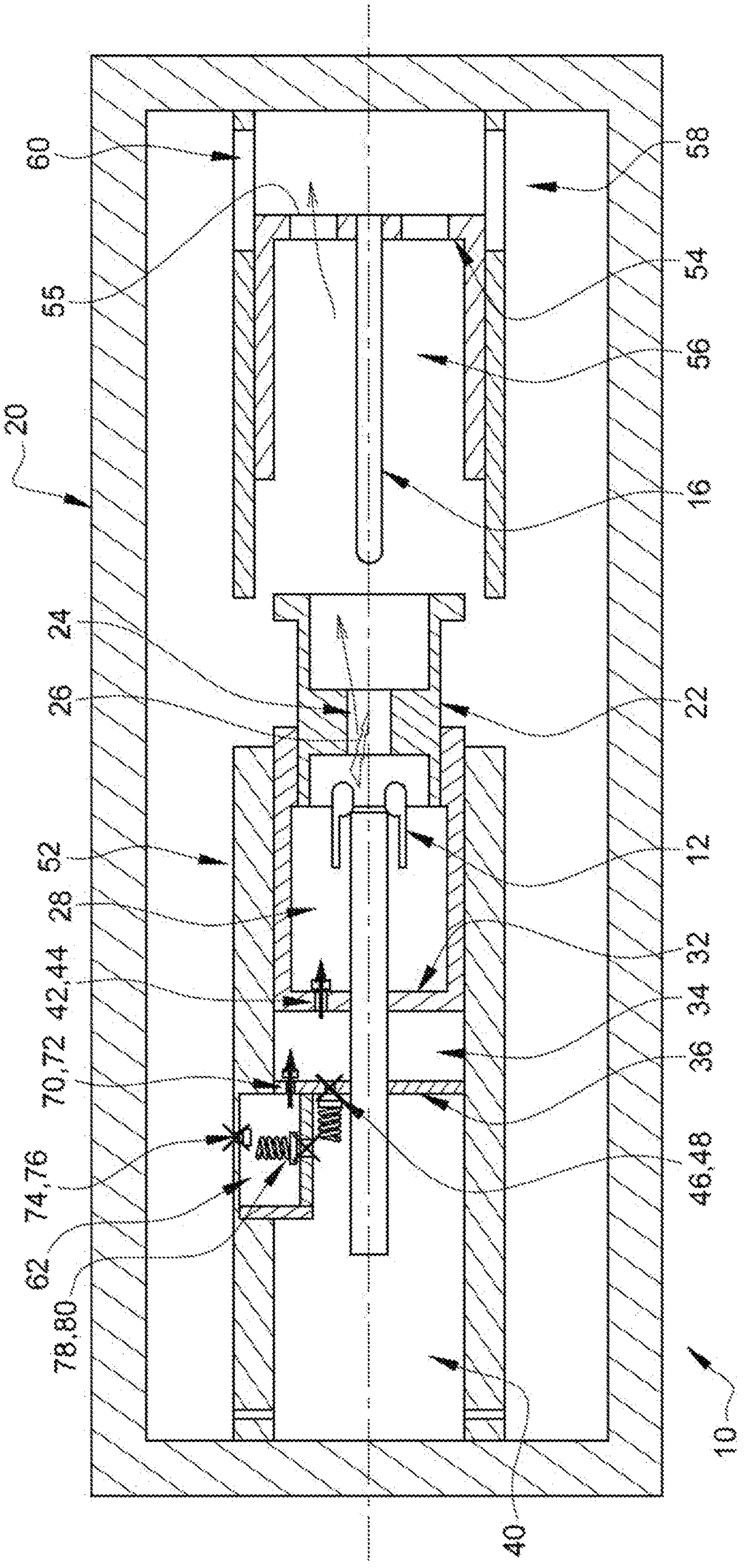

In a fifth step represented on FIG. 6, the electric arc 26 is generally not present anymore.

Most of the dielectric gas which was present in the thermal volume 28 and in the compression volume 34 has been discharged towards the electric arc 26, the gas pressure in the thermal volume 28 and in the compression volume 34 decreases as a consequence.

The gas pressure in the buffer volume 62 becomes greater than the gas pressure in the thermal volume 28 and in the compression volume 34. As a consequence, the primary valve 72 opens, allowing gas under pressure, that is stored in the buffer volume 62 to be discharged towards the electric arc 26 via the compression volume 34 and the thermal volume 28.

It can happen that the pressure in the buffer volume 62 becomes higher than the pressure in the compression volume before the thermal valve 42 opens. In this case, only the primary valve 72 will be open for a short time.

Here again, the temperature of the gas flowing from the buffer volume 62 towards the electric arc 26 is lower than the gas temperature in the thermal volume 28, allowing for an improved cooling of the thermal volume 28.

Figure 7:
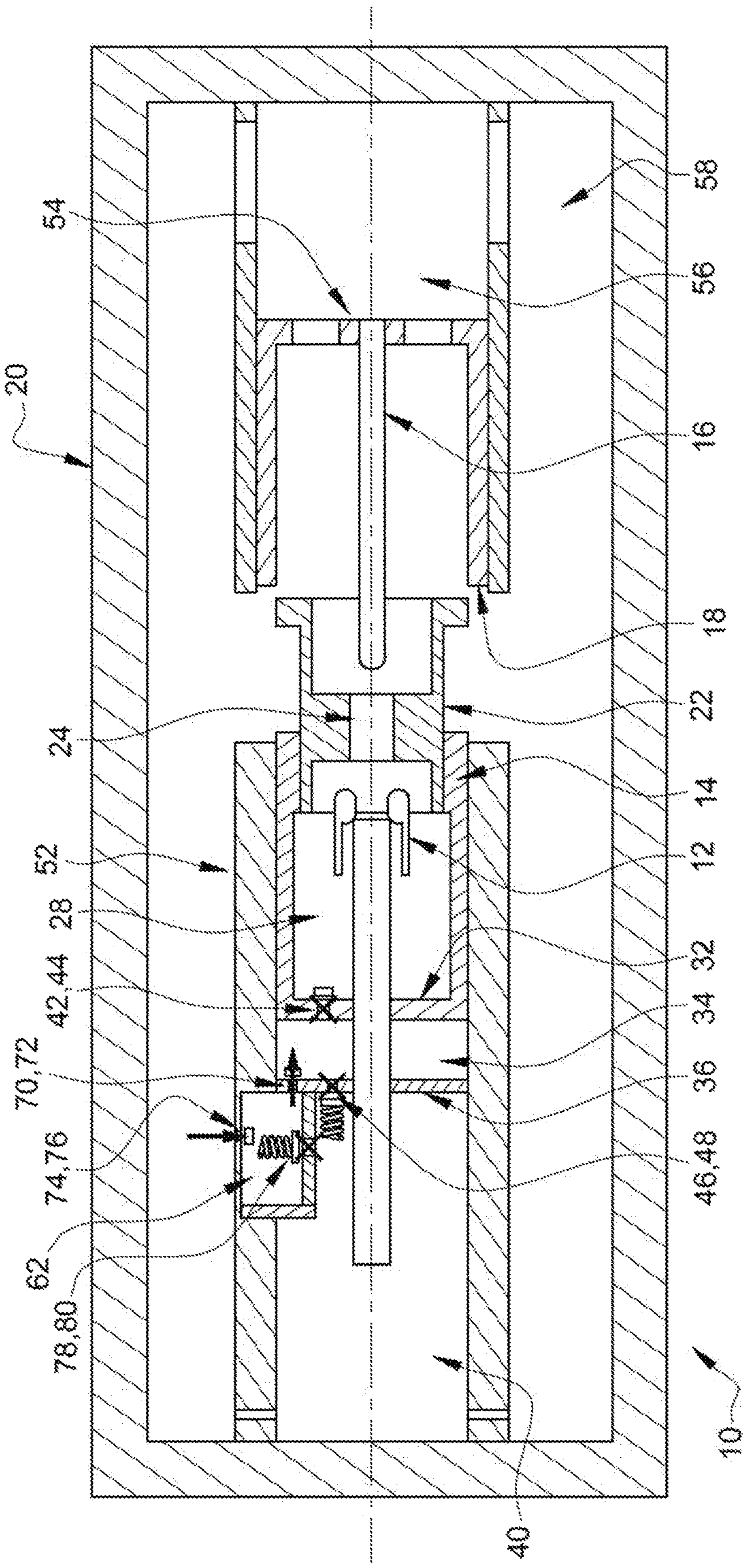
FIG. 7 is a diagram similar to FIG. 1, showing the valves configurations during a closing step of the circuit breaker according to the invention.

FIG. 7 represents a closing phase of the circuit breaker 10 according to the invention.

In this phase, the tulip-shaped female arcing contact 12 and the pin-shaped male arcing contact 16 move toward each other to come in contact and attain the closed configuration of the circuit breaker represented on FIG. 2.

During this movement of the arcing contacts 12, 16, the first radial wall 32 moves axially toward the pin-shaped male arcing contact 16, that is to say to the right in the drawings. The volume of the compression volume 34 increases, generating a drop in pressure.

The first valve 44 and the second valve 48 are designed to remain closed during this step.

As a consequence, the primary valve 72 opens, allowing gas from the buffer volume 62 to feed the compression volume 34; the secondary valve 76 opens, allowing fresh gas from the annular main chamber 58 to feed the buffer volume 62. The tertiary valve 80 remains closed during this step.

The buffer volume 62 is a volume that is designed to be selectively brought in communication with the compression volume 34, the exhaust gas chamber 40 or the annular main chamber 58. The setting of the spring associated to the secondary valve 76 allows to select the level of pressure at which the buffer volume will start to fill the compression volume 34. This defines therefore a short circuit current at which this buffer volume assistance will be triggered.

The location of the buffer volume 62 allows gas from the compression volume 34 to flow toward the exhaust gas chamber 40 with no restriction.

We claim:

1. A high-voltage circuit breaker filled with an insulating gas and having a main axis, comprising:

a female arcing contact and a male arcing contact that are designed to selectively be in electrical contact one with the other, that are radially surrounded by an insulating nozzle;

two main contacts facing axially each other and arranged radially outside of the insulating nozzle, each of the main contacts being assigned and electrically connected to one of the female arcing contact or the male arcing contact, a support carrying one of the two main contacts and an associated female arcing contact or male arcing contact, in which a thermal volume, a compression volume and an exhaust gas chamber are formed, so as to be aligned axially within the support, a first radial wall axially separating the thermal volume and the compression volume, which is axially movable within the support, a second radial wall axially separating the compression volume and the exhaust gas chamber, characterized in that the high-voltage circuit breaker further comprises a buffer volume that is separated from the compression volume and the exhaust gas chamber by associated walls, wherein the buffer volume is designed to be connected to the compression volume only to allow gas under pressure, that is stored in the buffer volume, to be discharged towards the compression volume, and wherein the buffer volume is also able to be selectively connected to the exhaust gas chamber and to an annular main chamber surrounding the support depending on operating conditions of the high-voltage circuit breaker.

2. The high-voltage circuit breaker according to claim 1, wherein the buffer volume is separated from the compression volume by the second radial wall, the second radial wall comprises a primary opening and an associated primary valve selectively connecting the buffer volume to the compression volume.

3. The high-voltage circuit breaker according to claim 1, wherein the buffer volume is separated from the annular main chamber by the support and wherein the support comprises a secondary opening and an associated secondary valve selectively connecting the buffer volume to the annular main chamber.

4. The high-voltage circuit breaker according to claim 1, wherein the buffer volume is separated from the exhaust gas chamber by an annular wall and wherein the annular wall comprises a tertiary opening and an associated tertiary valve selectively connecting the buffer volume to the exhaust gas chamber.

5. The high-voltage circuit breaker according to claim 1, wherein the first radial wall comprises a first opening associated with a first valve, selectively connecting the thermal volume to the compression volume.

6. The high-voltage circuit breaker according to claim 1, wherein the second radial wall comprises a second opening associated with a second valve, selectively connecting the compression volume to the exhaust gas chamber.

7. The high-voltage circuit breaker according to claim 1, wherein an opening phase of the circuit breaker consisting of an axial displacement of the first radial wall together with the female arcing contact in a direction away from the male arcing contact, comprises:

a first step during which only a first valve is opened and during which an electric contact between the arcing contacts cease, producing an electric arc;

a second step during which only a second valve and a tertiary valve are opened independently one from an other;

a third step during which all the valves are closed;

a fourth step during which only the first valve is opened; and a fifth step during which only the first valve and a primary valve are opened.

8. The high-voltage circuit breaker according to claim 7, wherein during a closing phase of the circuit breaker, following an opening phase, only the primary valve and a secondary valve are opened.

9. The high-voltage circuit breaker according to claim 1, wherein at least one valve is spring loaded to adjust the operating conditions of the circuit breaker on which the at least one valve opens.

* * * * *